United States Patent
Wang et al.

(10) Patent No.: US 9,654,559 B2
(45) Date of Patent: May 16, 2017

(54) METHOD, APPARATUS, AND SYSTEM FOR EXCHANGING DATA OF EDGE AREA USER ON CLOUD RADIO ACCESS NETWORK

(71) Applicant: Huawei Technologies Co., Ltd., Shenzhen, Guangdong (CN)

(72) Inventors: Jueping Wang, Shanghai (CN); Jianchun Wang, Shanghai (CN); Si Zhang, Shanghai (CN); Shaorui Wang, Shanghai (CN); Zuomin Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 14/322,468

(22) Filed: Jul. 2, 2014

(65) Prior Publication Data
US 2014/0317232 A1    Oct. 23, 2014

Related U.S. Application Data

(63) Continuation of application No. PCT/CN2012/087022, filed on Dec. 20, 2012.

(51) Int. Cl.
*G06F 15/16* (2006.01)
*H04L 29/08* (2006.01)

(52) U.S. Cl.
CPC ........ *H04L 67/1097* (2013.01); *H04L 67/289* (2013.01)

(58) Field of Classification Search
CPC .................. H04L 67/2814; H04L 67/289

USPC ........................................................ 709/217
See application file for complete search history.

(56) References Cited

U.S. PATENT DOCUMENTS

2009/0290555 A1* 11/2009 Alpert .............. H04W 4/20
370/331
2013/0100907 A1* 4/2013 Liu ................. H04L 5/0023
370/329

FOREIGN PATENT DOCUMENTS

| CN | 101895940 A | 11/2010 |
| CN | 102546080 A | 7/2012 |
| CN | 102595429 A | 7/2012 |
| CN | 102638297 A | 8/2012 |

* cited by examiner

*Primary Examiner* — Wing F Chan
*Assistant Examiner* — Andrew Woo

(57) ABSTRACT

A apparatus and system for exchanging data of an edge area user on a C-RAN are provided. The apparatus includes: at least one collaborative station of at least one neighboring C-RAN is determined for the edge area user on the C-RAN; control data is exchanged with the neighboring C-RAN collaborative station; a data exchange path used for exchanging first data with the neighboring C-RAN collaborative station is established according to the control data; the neighboring C-RAN collaborative station exchanges second data with the edge area user according to the control data. Based on the foregoing innovative mechanism, the C-RAN master station performs coupled collaboration with the neighboring C-RAN collaborative station by establishing the data exchange path, so that the neighboring C-RAN collaborative station may also exchange data with the edge area user, thereby enabling the edge area user on the C-RAN to obtain a better gain and improving system performance.

8 Claims, 7 Drawing Sheets

METHOD, APPARATUS, AND SYSTEM FOR EXCHANGING DATA OF EDGE AREA USER ON CLOUD RADIO ACCESS NETWORK

CROSS-REFERENCE TO RELATED APPLICATIONS

This application is a continuation of International Application No. PCT/CN2012/087022, filed on Dec. 20, 2012, which is hereby incorporated by reference in its entirety.

TECHNICAL FIELD

The present invention relates to the communications field, and in particular to a method, a related apparatus, and a system for exchanging data of an edge area user on a cloud radio access network.

BACKGROUND

A cloud radio access network (Cloud Radio Access Network, C-RAN) is a novel radio access network, and is a green radio access network architecture based on centralized processing, collaborative radio, and real-time cloud computing infrastructure. A C-RAN solution, compared with a stand-alone station solution, can provide features such as a tide resource pool, inter-station tightly coupled collaboration, and centralized management, thereby improving network performance. However, a user in an edge area of a C-RAN is incapable of obtaining the same performance gain as an inter-station user of the C-RAN.

SUMMARY

Embodiments of the present invention provide a method and a related apparatus for exchanging data of an edge area user on a cloud radio access network, so as to enable the edge area user on the C-RAN to obtain a better gain and improve system performance.

According to a first aspect, a method for exchanging data of an edge area user on a cloud radio access network C-RAN is provided, which may include:
  determining at least one collaborative station of at least one neighboring C-RAN for the edge area user on the C-RAN;
  exchanging control data with the neighboring C-RAN collaborative station;
  establishing, according to the control data, a data exchange path used for exchanging first data with the neighboring C-RAN collaborative station; and
  exchanging the first data with the neighboring C-RAN collaborative station through the data exchange path, so that the neighboring C-RAN collaborative station exchanges second data with the edge area user according to the control data.

In a first possible implementation, the exchanging the control data with the neighboring C-RAN collaborative station includes:
  exchanging the control data with the neighboring C-RAN collaborative station through a Transmission Control Protocol/Internet Protocol TCP/IP path or a control path of a high speed data exchange path.

With reference to the first aspect or the first possible implementation of the first aspect, in a second possible implementation, the data exchange path used for exchanging the first data is a high speed data exchange path, where the high speed data exchange path includes: a common public radio interface CPRI path, a rapid input/output RIO interface path, or an Ethernet interface path.

With reference to the first aspect, the first possible implementation of the first aspect, or the second possible implementation of the first aspect, in a third possible implementation, before the exchanging the first data with the neighboring C-RAN collaborative station through the data exchange path so that the neighboring C-RAN collaborative station exchanges the second data with the edge area user according to the control data, the method further includes:
  converging the first data with edge area user data of another edge area user that belongs to the same neighboring C-RAN as the edge area user;
  where the exchanging the first data with the neighboring C-RAN collaborative station through the data exchange path, so that the neighboring C-RAN collaborative station exchanges the second data with the edge area user according to the control data, specifically includes:
  sending the converged data of the edge area user to the neighboring C-RAN through the data exchange path, so that the neighboring C-RAN collaborative station acquires the first data from the neighboring C-RAN and sends the second data to the edge area user according to the control data; and
  receiving the first data from the neighboring C-RAN collaborative station through the data exchange path.

According to a second aspect, a method for exchanging data of an edge area user on a cloud radio access network C-RAN is provided, which may include:
  exchanging control data with a C-RAN master station to which the edge area user on the C-RAN belongs; and
  exchanging, according to the control data, first data with the C-RAN master station through a data exchange path established by the C-RAN master station, so as to exchange second data with the edge area user according to the control data.

In a first possible implementation, the exchanging the control data with the master station to which the edge area user on the C-RAN belongs includes:
  exchanging, through a Transmission Control Protocol/Internet Protocol TCP/IP path or a control path of a high speed data exchange path, the control data with the C-RAN master station to which the edge area user on the C-RAN belongs.

With reference to the second aspect or the first possible implementation of the second aspect, in a second possible implementation, the data exchange path used for exchanging the first data is a high speed data exchange path, where the high speed data exchange path includes: a common public radio interface CPRI path, a rapid input/output RIO interface path, or an Ethernet interface path.

With reference to the second aspect, the first possible implementation of the second aspect, or the second possible implementation of the second aspect, in a third possible implementation, before the exchanging, according to the control data, the first data with the C-RAN master station through the data exchange path established by the C-RAN master station so as to exchange the second data with the edge area user according to the control data, the method further includes:
  converging the first data with edge area user data of another edge area user that belongs to the same C-RAN as the edge area user;
  where the exchanging, according to the control data, the first data with the C-RAN master station through the data exchange path established by the C-RAN master station so as to exchange the second data with the edge area user according to the control data specifically includes:
sending the converged data of the edge area user to the C-RAN through the data exchange path, so that the C-RAN master station acquires the first data from the C-RAN; and
receiving the first data from the C-RAN master station through the data exchange path.

According to a third aspect, a cloud radio access network C-RAN master station is provided, which may include:
a determining unit, configured to determine at least one collaborative station of at least one neighboring C-RAN for an edge area user on a C-RAN;
a first exchange unit, configured to exchange control data with the neighboring C-RAN collaborative station;
a path establishing unit, configured to establish, according to the control data, a data exchange path used for exchanging first data with the neighboring C-RAN collaborative station; and
a second exchange unit, configured to exchange the first data with the neighboring C-RAN collaborative station through the data exchange path, so that the neighboring C-RAN collaborative station exchanges second data with the edge area user according to the control data.

In a first possible implementation, the first exchange unit includes:
a third exchange unit, configured to exchange the control data with the neighboring C-RAN collaborative station through a Transmission Control Protocol/Internet Protocol TCP/IP path or a control path of a high speed data exchange path.

With reference to the third aspect or the first possible implementation of the third aspect, in a second possible implementation, the data exchange path used for exchanging the first data is a high speed data exchange path, where the high speed data exchange path includes: a common public radio interface CPRI path, a rapid input/output RIO interface path, or an Ethernet interface path.

With reference to the third aspect, the first possible implementation of the third aspect, or the second possible implementation of the third aspect, in a third possible implementation, the C-RAN master station further includes:
a first converging unit, configured to converge the first data with edge area user data of another edge area user that belongs to the same neighboring C-RAN as the edge area user;
where the second exchange unit specifically includes:
a first sending unit, configured to send the converged data of the edge area user to the neighboring C-RAN through the data exchange path, so that the neighboring C-RAN collaborative station acquires the first data from the neighboring C-RAN and sends the second data to the edge area user according to the control data; and
a first receiving unit, configured to receive the first data from the neighboring C-RAN collaborative station through the data exchange path.

According to a fourth aspect, a neighboring cloud radio access network C-RAN collaborative station is provided, which may include:
a fourth exchange unit, configured to exchange control data with a C-RAN master station to which an edge area user on the C-RAN belongs; and
a fifth exchange unit, configured to exchange, according to the control data, first data with the C-RAN master station through a data exchange path established by the C-RAN master station, so as to exchange second data with the edge area user according to the control data.

In a first possible implementation, the fourth exchange unit includes:
a sixth exchange unit, configured to exchange, through a Transmission Control Protocol/Internet Protocol TCP/IP path or a control path of a high speed data exchange path, the control data with the C-RAN master station to which the edge area user on the C-RAN belongs.

With reference to the fourth aspect or the first possible implementation of the fourth aspect, in a second possible implementation, the data exchange path used for exchanging the first data is a high speed data exchange path, where the high speed data exchange path includes: a common public radio interface CPRI path, a rapid input/output RIO interface path, or an Ethernet interface path.

With reference to the fourth aspect, the first possible implementation of the fourth aspect, or the second possible implementation of the fourth aspect, in a third possible implementation, the neighboring C-RAN collaborative station further includes:
a second converging unit, configured to converge the first data with edge area user data of another edge area user that belongs to the same C-RAN as the edge area user;
where the fifth exchange unit specifically includes:
a second sending unit, configured to send the converged data of the edge area user to the C-RAN through the data exchange path, so that the C-RAN master station acquires the first data from the C-RAN; and
a second receiving unit, configured to receive the first data from the C-RAN master station through the data exchange path.

According to a fifth aspect, a system for exchanging data of an edge area user on a cloud radio access network C-RAN is provided, which may include:
the C-RAN master station according to the third aspect, the first possible implementation of the third aspect, the second possible implementation of the third aspect, or the third possible implementation of the third aspect, and the neighboring C-RAN collaborative station according to the fourth aspect, the first possible implementation of the fourth aspect, the second possible implementation of the fourth aspect, or the third possible implementation of the fourth aspect, where
the C-RAN master station determines a neighboring C-RAN collaborative station for the edge area user on the C-RAN;
the C-RAN master station exchanges control data with the neighboring C-RAN collaborative station;
the C-RAN master station is connected to the neighboring C-RAN collaborative station through a data exchange path used for exchanging first data; and
the C-RAN master station exchanges the first data with the neighboring C-RAN collaborative station through the data exchange path, so that the neighboring C-RAN collaborative station exchanges second data with the edge area user according to the control data.

In a first possible implementation, a manner for networking a C-RAN to which the C-RAN master station belongs and a C-RAN to which the neighboring C-RAN collaborative station belongs includes: a star type, a chain type, or a ring type.

According to a sixth aspect, a device for exchanging data of an edge area user on a cloud radio access network C-RAN is provided, which may include: an input apparatus, an output apparatus, a memory, and a processor.

The processor performs the following steps:

determining at least one collaborative station of at least one neighboring C-RAN for the edge area user on the C-RAN;

exchanging control data with the neighboring C-RAN collaborative station;

establishing, according to the control data, a data exchange path used for exchanging first data with the neighboring C-RAN collaborative station; and exchanging the first data with the neighboring C-RAN collaborative station through the data exchange path, so that the neighboring C-RAN collaborative station exchanges second data with the edge area user according to the control data.

According to a seventh aspect, a device for exchanging data of an edge area user on a cloud radio access network C-RAN is provided, which may include: an input apparatus, an output apparatus, a memory, and a processor.

The processor performs the following steps:

exchanging control data with a C-RAN master station to which the edge area user on the C-RAN belongs; and exchanging, according to the control data, first data with the C-RAN master station through a data exchange path established by the C-RAN master station, so as to exchange second data with the edge area user according to the control data.

According to the preceding solutions, a C-RAN master station performs coupled collaboration with a neighboring C-RAN collaborative station by establishing a data exchange path, so that the neighboring C-RAN collaborative station may also exchange data with an edge area user, thereby enabling the edge area user on a C-RAN to obtain a better performance gain and improving system performance.

BRIEF DESCRIPTION OF THE DRAWINGS

To illustrate the technical solutions according to the embodiments of the present invention or in the prior art more clearly, the following briefly introduces the accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

DETAILED DESCRIPTION

Embodiments of the present invention provide a method and a related apparatus for exchanging data of an edge area user on a C-RAN, so as to enable the edge area user on the C-RAN to obtain a better gain and improve system performance.

For the purpose of making the objectives, features, and advantages of the present invention more obvious and comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

The following separately makes detailed description with reference to specific embodiments.

Figure 1:
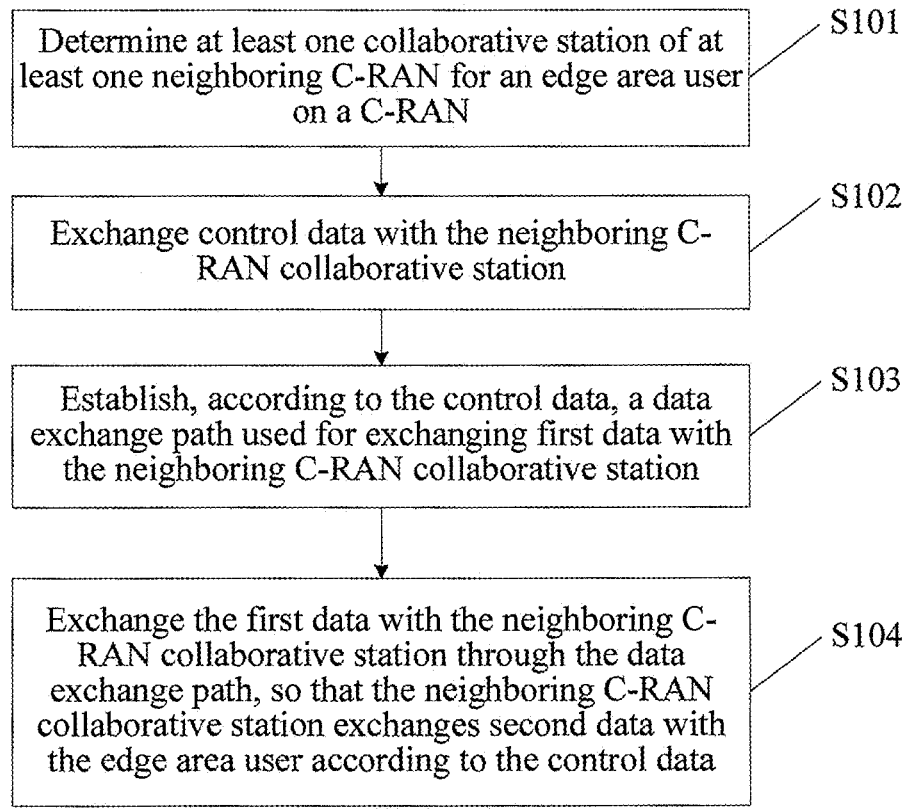
FIG. 1 is a flow chart of a method in an embodiment of a method for exchanging data of an edge area user on a C-RAN.

FIG. 1 is a flow chart of a method in an embodiment of a method for exchanging data of an edge area user on a C-RAN. As shown in FIG. 1, the method is applied to a C-RAN master station and includes the following steps:

Step S101: Determine at least one collaborative station of at least one neighboring C-RAN for the edge area user on the C-RAN.

In this embodiment, the edge area user belongs to a station of the C-RAN, and the station is referred to as a master station of the edge area user. However, the edge area user is located at edges of the C-RAN and one or more neighboring C-RANs, and therefore received signals are weak and prone to interference of signals from a station of a neighboring C-RAN.

The C-RAN master station acquires neighboring cell information of the neighboring C-RAN from a core network or receives the neighboring cell information reported by the edge area user, determines a station list of the neighboring C-RAN according to the neighboring cell information, and determines, from the station list, at least one station of at least one neighboring C-RAN as a collaborative station of the C-RAN master station of the edge area user.

The master station queries the collaborative station from an upper-layer network element. The upper-layer network element returns a C-RAN where the collaborative station is located according to a configured network structure and indicates routing information.

Step S102: Exchange control data with the neighboring C-RAN collaborative station.

In this step, the C-RAN master station exchanges the control data with the neighboring C-RAN collaborative station through an established path, where the control data is used for negotiation and message transmission between stations. Firstly, the C-RAN master station initiates a handshake signal to the neighboring C-RAN collaborative station according to the routing information provided by the upper-layer network element, and after a response from the neighboring C-RAN collaborative station is received, a communication route is established. Then, the control data is provided for each subsequent step.

Step S103: Establish a data exchange path used for exchanging first data with the neighboring C-RAN collaborative station according to the control data.

In this embodiment, data of the edge area user is rapid data and occupies a great bandwidth, for example, baseband data. Therefore, according to the control data that specifies a certain path between the C-RAN master station and the neighboring C-RAN collaborative station be used as a data exchange path for exchanging the first data, a data exchange path for exchanging data of the edge area user is established between the C-RAN master station and the neighboring C-RAN collaborative station.

Step S104: Exchange the first data with the neighboring C-RAN collaborative station through the data exchange path, so that the neighboring C-RAN collaborative station exchanges second data with the edge area user according to the control data.

In this step, the C-RAN master station exchanges the first data with the neighboring C-RAN collaborative station through the established data exchange path; and then, the neighboring C-RAN collaborative station parses the control data and exchanges the second data with the edge area user, thereby completing data exchange with the edge area user.

Specifically, in a first aspect, the C-RAN master station sends the first data to the neighboring C-RAN collaborative station through the data exchange path, and the neighboring C-RAN collaborative station parses the control data, where the first data may be in-phase/quadrature (In-phase/Quadrature, I/Q) data and may also be rapid input/output (Rapid IO, RIO) data. After receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

In a second aspect, the C-RAN master station instructs, through the control data, the neighboring C-RAN collaborative station to acquire the second data from the edge area user and then receives the first data sent by the neighboring C-RAN collaborative station, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

Figure 2:
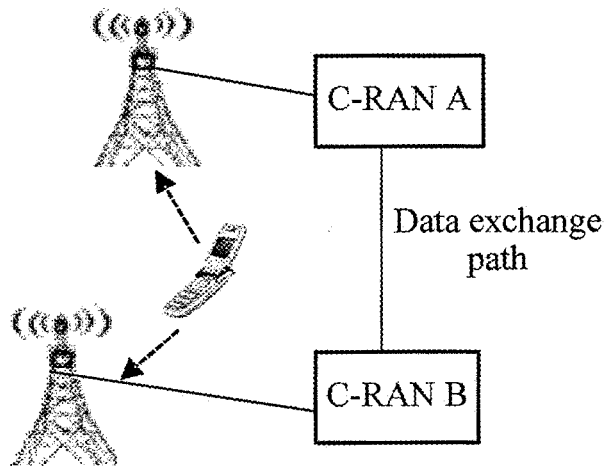
FIG. 2 is a schematic diagram of coupled collaboration between a C-RAN master station and a neighboring C-RAN collaborative station.

FIG. 2 is a schematic diagram of coupled collaboration between a C-RAN master station and a neighboring C-RAN collaborative station. As shown in FIG. 2, a C-RAN A master station of a cell phone terminal is connected to a neighboring C-RAN B collaborative station of the C-RAN A through a data exchange path. The C-RAN A master station and the C-RAN B collaborative station are in coupled collaboration. The C-RAN A master station is capable of exchanging data with the C-RAN B collaborative station through the data exchange path. Then, the C-RAN B collaborative station exchanges data with the cell phone terminal.

According to a method for exchanging data of an edge area user on a C-RAN provided by an embodiment of the present invention, a C-RAN master station performs coupled collaboration with a neighboring C-RAN collaborative station by establishing a data exchange path, so that the neighboring C-RAN collaborative station may also exchange data with the edge area user, thereby enabling the edge area user on the C-RAN to obtain a better gain and improving system performance.

Figure 3:
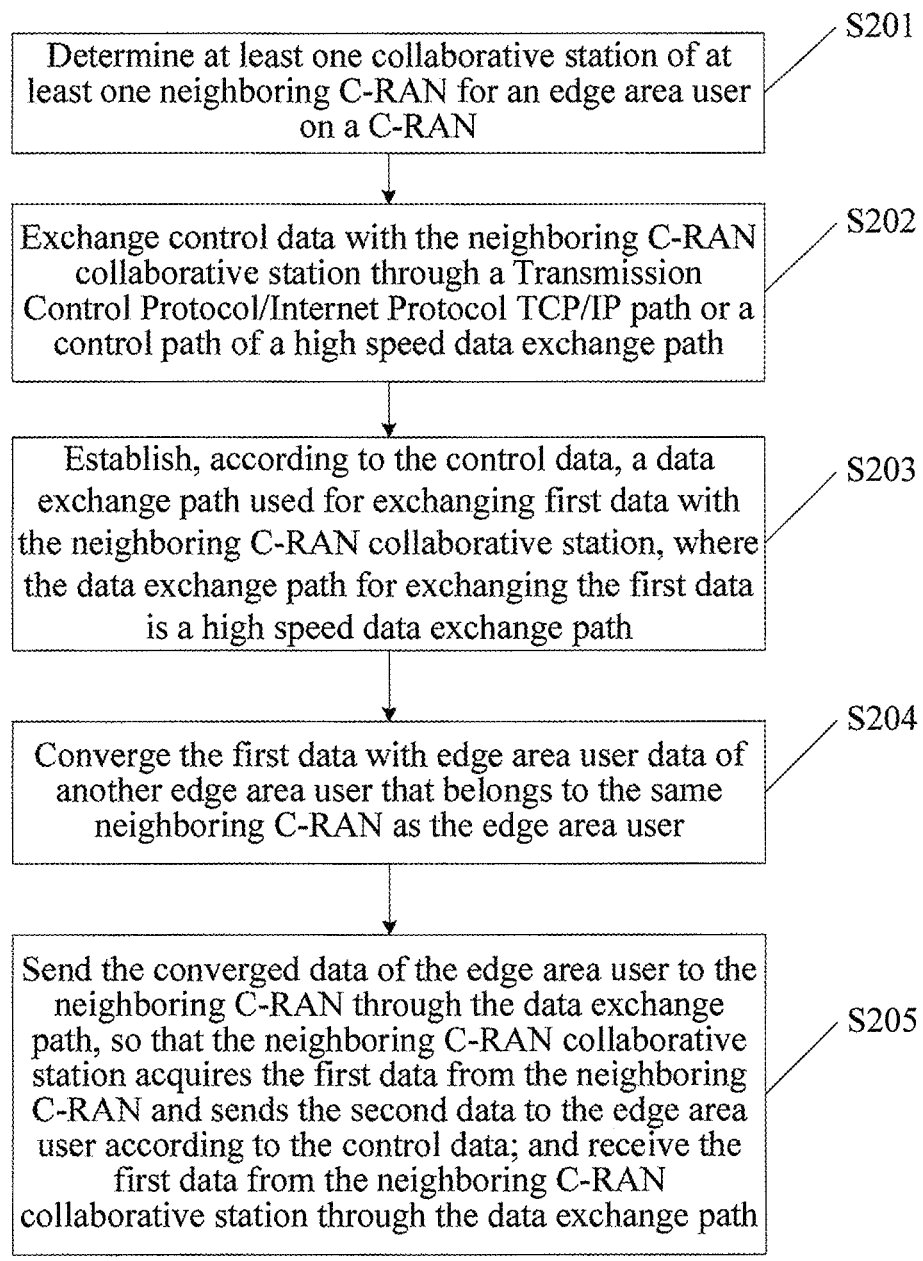
FIG. 3 is a flow chart of a method in another embodiment of a method for exchanging data of an edge area user on a C-RAN.

FIG. 3 is a flow chart of a method in another embodiment of a method for exchanging data of an edge area user on a C-RAN. As shown in FIG. 3, the method includes the following steps:

Step S201: Determine at least one collaborative station of at least one neighboring C-RAN for the edge area user on the C-RAN.

In this embodiment, the edge area user belongs to a station of the C-RAN, and the station is referred to as a master station of the edge area user. However, the edge area user is located at edges of the C-RAN and one or more neighboring C-RANs, and therefore received signals are weak and prone to interference of signals from a station of a neighboring C-RAN.

The C-RAN master station acquires neighboring cell information of the neighboring C-RAN from a core network or receives the neighboring cell information reported by the edge area user, determines a station list of the neighboring C-RAN according to the neighboring cell information, and determines, from the station list, at least one station of at least one neighboring C-RAN as a collaborative station of the C-RAN master station of the edge area user.

The master station queries the collaborative station from an upper-layer network element. The upper-layer network element returns a C-RAN where the collaborative station is located according to a configured network structure and indicates routing information.

Step S202: Exchange control data with the neighboring C-RAN collaborative station through a Transmission Control Protocol/Internet Protocol TCP/IP path or a control path of a high speed data exchange path.

In this step, the C-RAN master station exchanges the control data with the neighboring C-RAN collaborative station through an established path, where the control data is used for negotiation and message transmission between stations. Firstly, the C-RAN master station initiates a handshake signal to the neighboring C-RAN collaborative station according to the routing information provided by the upper-layer network element, and after a response from the neighboring C-RAN collaborative station is received, a communication route is established. Then, the control data is provided for each subsequent step.

The control data may be exchanged through an established separate Transmission Control Protocol/Internet Protocol (Transmission Control Protocol/Internet Protocol, TCP/IP) path that is used to bear the control data. For example, an X2 interface path (X2 Interface) may be used. According to the 3rd generation partnership project (The 3rd Generation Partnership Project, 3GPP), an X2 interface is defined between traditional macro stations (also known as macro sites), and after a C-RAN solution is adopted, it is assumed that the interface is inherited by the C-RAN. A transmission network layer of the X2 interface is based on IP transmission.

Figure 4:
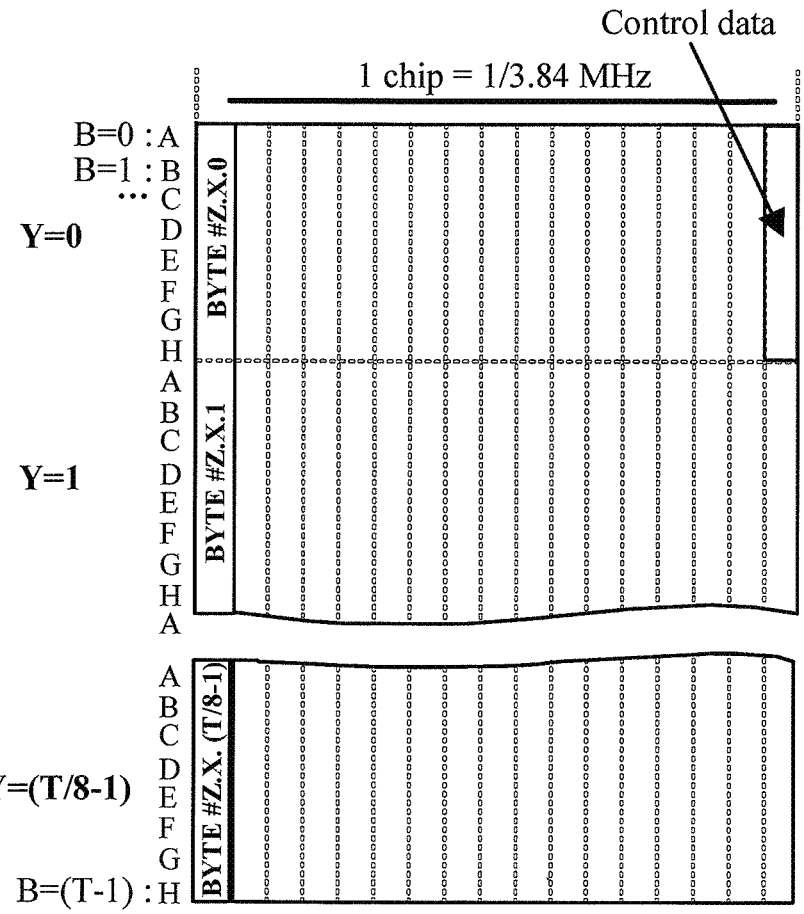
FIG. 4 is a schematic diagram of a CPRI I/Q path used as a control path.

The control data may also be exchanged through a control path of an established physical high speed data exchange path. For example, for transmission of common public radio interface (CPRI) data, a reserved field of the control path in the CPRI protocol may be used to bear the control data between the C-RAN master station and the neighboring C-RAN collaborative station; and a part of bit data may also be defined in a CPRI I/Q path and used as a control path for exchanging the control data, as shown in FIG. 4, which is a schematic diagram of a CPRI I/Q path used as a control path.

Step S203: Establish a data exchange path used for exchanging first data with the neighboring C-RAN collaborative station according to the control data, where the data exchange path for exchanging the first data is a high speed data exchange path.

Data of the edge area user in the present invention is rapid data and occupies a great bandwidth, for example, baseband data. Therefore, if the edge area user wants to obtain a desirable gain, the C-RAN master station and the neighboring C-RAN collaborative station should perform tightly coupled collaboration. The tightly coupled collaboration refers to that high-bandwidth data of other stations may be obtained rapidly for collaborative processing. Conversely, loosely coupled collaboration refers to that low-bandwidth data of other stations may be obtained slowly for collaborative processing.

Currently in the industry, no tightly coupled data exchange path is available between C-RANs, and therefore an edge area user on a C-RAN cannot obtain a gain of the tightly coupled collaboration. A current C-RAN solution in the industry only defines internal interfaces on the C-RAN, but does not define any tightly coupled interface between the C-RANs. However, according to the 3GPP, an X2 interface is defined between traditional macro stations, and after a C-RAN solution is adopted, it is assumed that the interface is inherited by the C-RAN. A transmission network layer of the X2 interface is based on IP transmission and mainly used for signaling transmission, and has a low bandwidth and a great delay. If a traditional X2 interface is adopted between the C-RANs, a loosely coupled collaboration solution, which has a lower gain than the tightly coupled collaboration, is mostly be used for the edge area user on the C-RAN. Therefore, user experience of the edge area user is poorer than that of a user in the coverage of the C-RAN. The solution has the following defects: the gain of the loosely coupled collaboration is less than that of the tightly coupled collaboration; and if the X2 interface is used for the transmission of CPRI layer-1 (Layer 1, L1) data, both the delay and the bandwidth fail to satisfy the requirement of a tightly coupled collaboration algorithm.

In this embodiment, a physical high speed data exchange path is available between a C-RAN master station and a neighboring C-RAN collaborative station, where a part of the high speed data exchange path is defined in step S202 as a path for exchanging control data. In this step, another part of the high speed data exchange path is defined as a data exchange path for exchanging first data. Alternatively, in step S202, a TCP/IP path is used as a path for exchanging the control data; and then, in this step, the entire high speed data exchange path is defined as a data exchange path for exchanging the first data, thereby establishing a data exchange path for exchanging data of an edge area user between the C-RAN master station and the neighboring C-RAN collaborative station. The high speed data exchange path includes: a CPRI interface path, an RIO interface path, and an Ethernet interface path.

According to the embodiment of the present invention, tightly coupled collaboration between a C-RAN master station and a neighboring C-RAN collaborative station may be implemented by using a high speed data exchange path, thereby enabling an edge area user on a C-RAN to obtain a better gain and improving system performance.

Step S204: Converge the first data with edge area user data of another edge area user that belongs to the same neighboring C-RAN as the edge area user.

In this embodiment, a high speed data exchange path is used to exchange data of an edge area user between a C-RAN master station and a neighboring C-RAN collaborative station. For example, a CPRI path is used for exchanging CPRI data. The CPRI path has a large bandwidth, and therefore resources will be wasted if data of only one edge area user is transmitted from a radio remote unit (Radio Remote Unit, RRU) each time.

In this step, when the C-RAN master station sends the first data to the neighboring C-RAN collaborative station, the first data needs to be converged with the edge area user data of another edge area user that belongs to the same neighboring C-RAN as the edge area user. For example, four pieces of 2.5 G data are converted into 10 G data; and the C-RAN is connected to one neighboring C-RAN by one or more high speed data exchange paths, for example, a CPRI path. One CPRI path has multiple internal channels, and converged data of multiple edge area users is borne in separate channels according to the control data.

Step S205: Send the converged data of the edge area user to the neighboring C-RAN through the data exchange path, so that the neighboring C-RAN collaborative station acquires the first data from the neighboring C-RAN and sends second data to the edge area user according to the control data; and receive the first data from the neighboring C-RAN collaborative station through the data exchange path.

In this step, in a first aspect, the C-RAN master station sends the converged data of the edge area user to the neighboring C-RAN through the high speed data exchange path; and then the collaborative station acquires, from a corresponding channel of the neighboring C-RAN, the first data actively sent by the C-RAN master station to the collaborative station, where the first data may be I/Q data and may also be RIO data. Subsequently, after receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

In a second aspect, the C-RAN master station instructs the neighboring C-RAN collaborative station to acquire the second data from the edge area user, and then receives the first data sent by the neighboring C-RAN collaborative station, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

According to the method for exchanging data of an edge area user on a C-RAN provided by another embodiment of the present invention, a C-RAN master station performs coupled collaboration with a neighboring C-RAN collaborative station by establishing a high speed data exchange path, so that the neighboring C-RAN collaborative station may also exchange data with the edge area user, thereby enabling the edge area user on the C-RAN to obtain a better gain and improving system performance.

Figure 5:
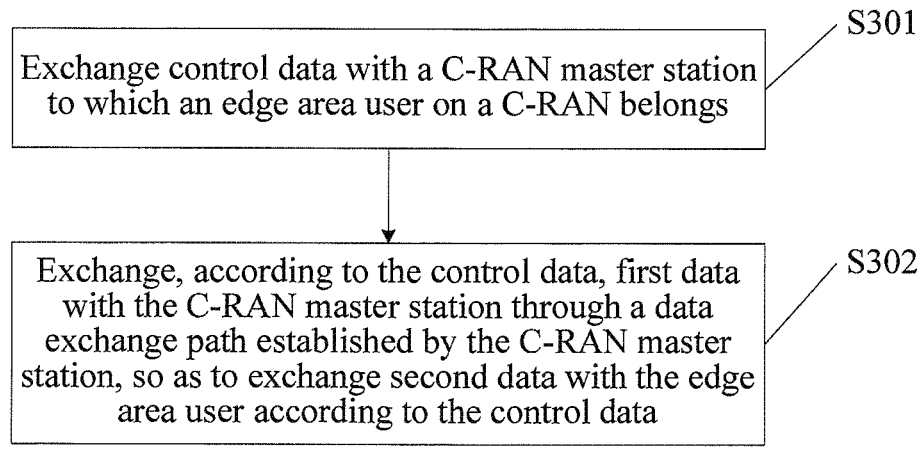
FIG. 5 is a flow chart of a method in still another embodiment of a method for exchanging data of an edge area user on a C-RAN.

FIG. 5 is a flow chart of a method in still another embodiment of a method for exchanging data of an edge area user on a C-RAN. As shown in FIG. 5, the method is applied to a neighboring C-RAN collaborative station and includes the following steps:

Step S301: Exchange control data with a C-RAN master station to which the edge area user on the C-RAN belongs.

In this step, the neighboring C-RAN collaborative station exchanges, through an established path, the control data with the C-RAN master station to which the edge area user on the C-RAN belongs, where the control data is used for negotiation and message transmission between stations. Firstly, the neighboring C-RAN collaborative station receives a handshake signal that is initiated by the C-RAN master station according to routing information provided by an upper-layer network element, and responds to the handshake signal. In this manner, a route for communicating with the C-RAN master station is established. Then, the control data is provided for each subsequent step.

Step S302: Exchange, according to the control data, first data with the C-RAN master station through a data exchange path established by the C-RAN master station, so as to exchange second data with the edge area user according to the control data.

In this step, the neighboring C-RAN collaborative station exchanges the first data with the C-RAN master station through the established data exchange path; and then the neighboring C-RAN collaborative station exchanges second data with the edge area user, thereby completing data exchange with the edge area user.

Specifically, in a first aspect, the neighboring C-RAN collaborative station receives the first data that is sent by the C-RAN master station through the data exchange path, where the first data may be I/Q data and may also be RIO data. After receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

In a second aspect, the neighboring C-RAN collaborative station receives, from the C-RAN master station, the control data that instructs the neighboring C-RAN collaborative station to acquire the second data from the edge area user, and acquires the second data from the edge area user, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

According to the method for exchanging data of an edge area user on a C-RAN provided in still another embodiment of the present invention, a neighboring C-RAN collaborative station performs coupled collaboration with a C-RAN master station through a data exchange path established by the C-RAN master station, so that the neighboring C-RAN collaborative station may also exchange data with the edge area user, thereby enabling the edge area user on the C-RAN to obtain a better gain and improving system performance.

Figure 6:
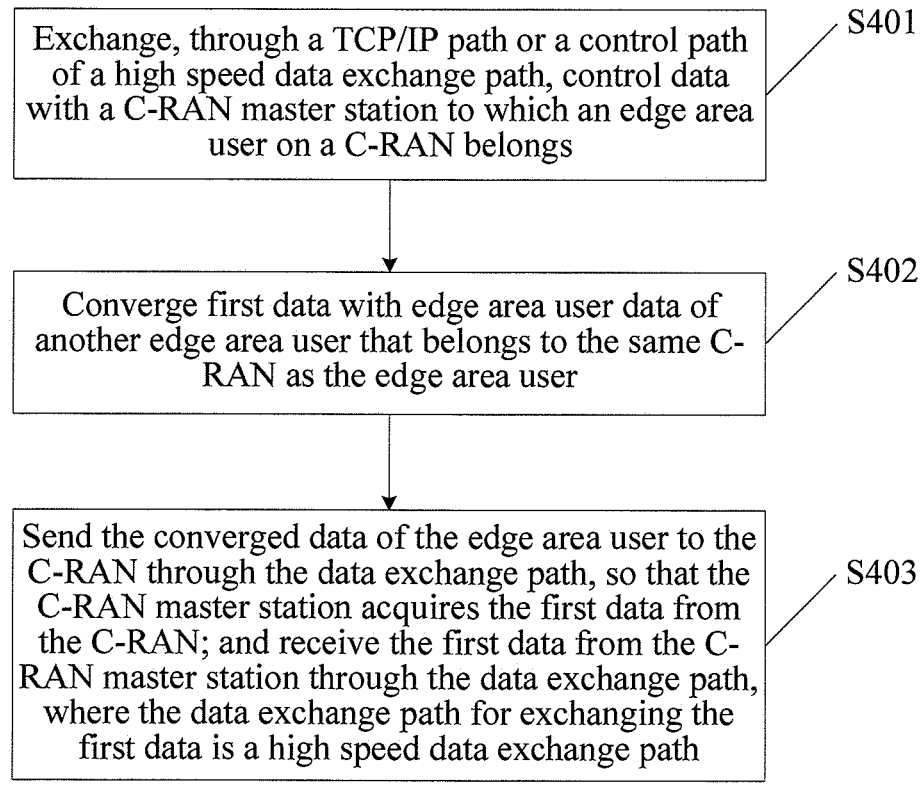
FIG. 6 is a flow chart of a method in still another embodiment of a method for exchanging data of an edge area user on a C-RAN.

FIG. 6 is a flow chart of a method in still another embodiment of a method for exchanging data of an edge area user on a C-RAN. As shown in FIG. 6, the method is applied to a neighboring C-RAN collaborative station and includes the following steps:

Step S401: Exchange, through a TCP/IP path or a control path of a high speed data exchange path, control data with a C-RAN master station to which the edge area user on the C-RAN belongs.

In this step, the neighboring C-RAN collaborative station exchanges, through an established path, the control data with the C-RAN master station to which the edge area user on the C-RAN belongs, where the control data is used for negotiation and message transmission between stations. Firstly, the neighboring C-RAN collaborative station receives a handshake signal that is initiated by the C-RAN master station according to routing information provided by an upper-layer network element, and responds to the handshake signal. In this manner, a route for communicating with the C-RAN master station is established. Then, the control data is provided for each subsequent step.

The control data may be exchanged through an established separate TCP/IP path that is used to bear the control data. For example, an X2 interface path may be used. According to the 3GPP, an X2 interface is defined between traditional macro stations, and after a C-RAN solution is adopted, it is assumed that the interface is inherited by the C-RAN. A transmission network layer of the X2 interface is based on IP transmission.

The control data may also be exchanged through a control path of an established physical high speed data exchange path. For example, for transmission of CPRI data, a reserved field of the control path in the CPRI protocol may be used to bear the control data between the C-RAN master station and the neighboring C-RAN collaborative station; and a part of BITs may also be defined in a CPRI I/Q path and used as a control path for exchanging the control data, as shown in FIG. 4, which is a schematic diagram of a CPRI I/Q path used as a control path.

Step S402: Converge first data with edge area user data of another edge area user that belongs to the same C-RAN as the edge area user.

In this embodiment, data of the edge area user is exchanged through a high speed data exchange path between the neighboring C-RAN collaborative station and the C-RAN master station. For example, CPRI data is exchanged through a CPRI path that has a fixed rate, however, data of one edge area user from an RRU may not reach the fixed rate, and therefore resources will be wasted if data of only one edge area user is transmitted each time.

In this step, when the neighboring C-RAN collaborative station sends the first data to the C-RAN master station, the first data needs to be converged with the edge area user data of another edge area user that belongs to the same C-RAN as the edge area user. For example, four pieces of 2.5 G data are converted into 10 G data; and the C-RAN is connected to one neighboring C-RAN by one CPRI path. One CPRI path has multiple internal channels, and converged data of multiple edge area users is borne in separate channels according to the control data.

Before the convergence is performed, the neighboring C-RAN collaborative station receives second data from the edge area user, where the second data may be an intermediate radio frequency signal, processes the second data to the first data, and converges the first data with the edge area user data of another edge area user that belongs to the same C-RAN as the edge area user. The first data herein may be I/Q data, and to process the second data to the first data is to process the intermediate radio frequency signal to RIO data and then process the RIO data to the I/Q data. Alternatively, the first data may also be RIO data, and to process the second data to the first data is to process the intermediate radio frequency signal to the RIO data.

Step S403: Send the converged data of the edge area user to the C-RAN through the data exchange path, so that the C-RAN master station acquires the first data from the C-RAN; and receive the first data from the C-RAN master station through the data exchange path, where the data exchange path for exchanging the first data is a high speed data exchange path.

In this step, in a first aspect, the neighboring C-RAN collaborative station sends the converged data of the edge area user to the C-RAN through the high speed data exchange path; and then the master station acquires, from a corresponding channel of the C-RAN, the first data sent by the neighboring C-RAN collaborative station to the master station.

In a second aspect, the neighboring C-RAN collaborative station receives the first data from the C-RAN master station through the high speed data exchange path and sends the first data to the edge area user.

According to the method for exchanging data of an edge area user on a C-RAN provided in yet another embodiment of the present invention, a neighboring C-RAN collaborative station performs tightly coupled collaboration with a C-RAN master station through a high speed data exchange path established by the C-RAN master station, so that the neighboring C-RAN collaborative station may also exchange rapid and great-bandwidth data with the edge area user, thereby enabling the edge area user on the C-RAN to obtain a better gain and improving system performance.

Figure 7:
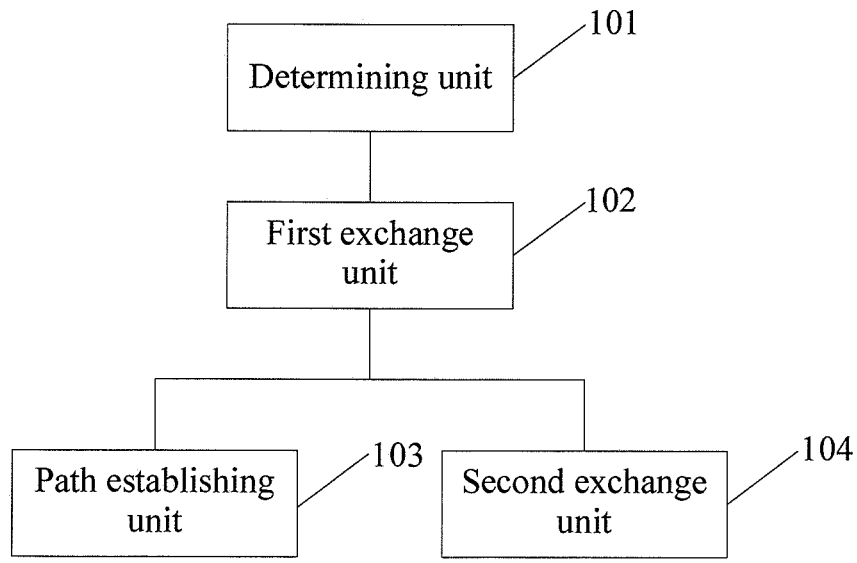
FIG. 7 is a schematic structural diagram of a C-RAN master station according to an embodiment of the present invention.

FIG. 7 is a schematic structural diagram of a C-RAN master station according to an embodiment of the present invention. As shown in FIG. 7, the C-RAN master station includes:

a determining unit 101, configured to determine at least one collaborative station of at least one neighboring C-RAN for an edge area user on a C-RAN;

In this embodiment, the edge area user belongs to a station of the C-RAN, and the station is referred to as a master station of the edge area user. However, the edge area user is located at edges of the C-RAN and one or more neighboring C-RANs, and therefore received signals are weak and prone to interference of signals from a station of a neighboring C-RAN.

The C-RAN master station acquires neighboring cell information of the neighboring C-RAN from a core network or receives the neighboring cell information reported by the edge area user; and the determining unit 101 determines a station list of the neighboring C-RAN according to the neighboring cell information and determines, from the station list, at least one station of at least one neighboring C-RAN as a collaborative station of the C-RAN master station of the edge area user.

The master station queries the collaborative station from an upper-layer network element. The upper-layer network element returns a C-RAN where the collaborative station is located according to a configured network structure and indicates routing information.

A first exchange unit 102 is configured to exchange control data with the neighboring C-RAN collaborative station.

The C-RAN master station exchanges the control data with the neighboring C-RAN collaborative station through an established path, where the control data is used for negotiation and message transmission between stations. Firstly, the C-RAN master station initiates a handshake signal to the neighboring C-RAN collaborative station according to the routing information provided by the upper-layer network element, and after a response from the neighboring C-RAN collaborative station is received, a communication route is established. Then, the control data is provided for other functional units.

A path establishing unit 103 is configured to establish a data exchange path used for exchanging first data with the neighboring C-RAN collaborative station according to the control data.

In this embodiment, data of the edge area user is rapid data and occupies a great bandwidth, for example, baseband data. Therefore, according to the control data that specifies a certain path between the C-RAN master station and the neighboring C-RAN collaborative station be used as a data exchange path for exchanging the first data, a data exchange path for exchanging data of the edge area user is established between the C-RAN master station and the neighboring C-RAN collaborative station.

A second exchange unit 104 is configured to exchange the first data with the neighboring C-RAN collaborative station through the data exchange path, so that the neighboring C-RAN collaborative station exchanges second data with the edge area user according to the control data.

The second exchange unit 104 exchanges the first data with the neighboring C-RAN collaborative station through the established data exchange path; and then the neighboring C-RAN collaborative station parses the control data and exchanges the second data with the edge area user, thereby completing data exchange with the edge area user.

Specifically, in a first aspect, the second exchange unit 104 sends the first data to the neighboring C-RAN collaborative station through the data exchange path, and the neighboring C-RAN collaborative station parses the control data, where the first data may be I/Q data and may also be RIO data. After receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

In a second aspect, the second exchange unit 104 instructs, through the control data, the neighboring C-RAN collaborative station to acquire the second data from the edge area user, and then receives the first data sent by the neighboring C-RAN collaborative station, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

According to the C-RAN master station provided by an embodiment of the present invention, the C-RAN master station performs coupled collaboration with a neighboring C-RAN collaborative station by establishing a data exchange path, so that the neighboring C-RAN collaborative station may also exchange data with an edge area user, thereby enabling the edge area user on a C-RAN to obtain a better gain and improving system performance.

Figure 8:
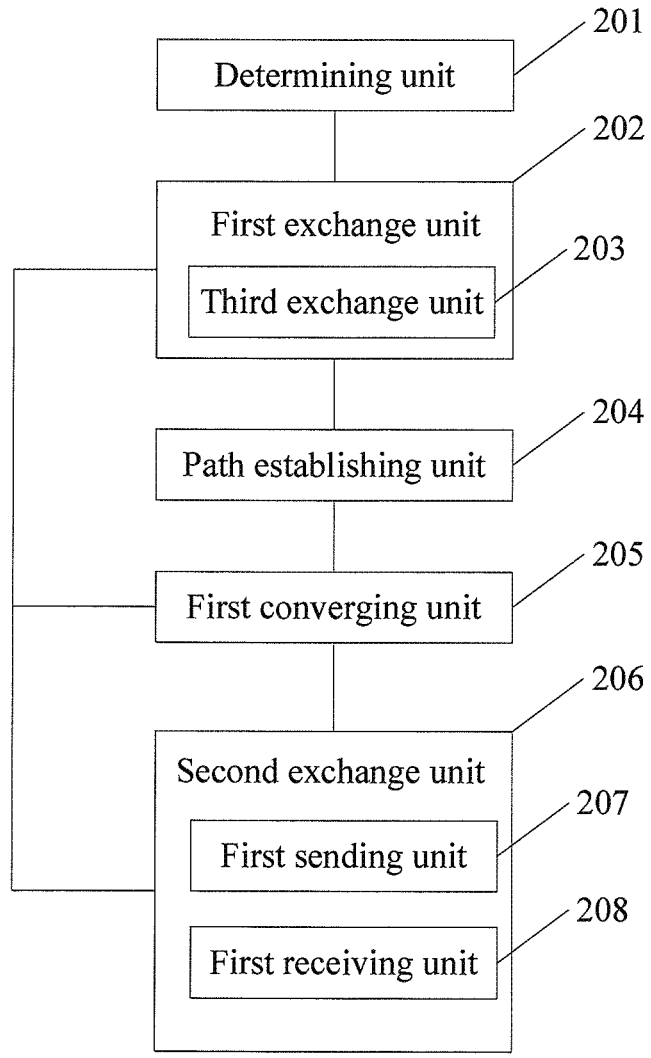
FIG. 8 is a schematic structural diagram of a C-RAN master station according to another embodiment.

FIG. 8 is a schematic structural diagram of a C-RAN master station according to another embodiment. As shown in FIG. 8, the C-RAN master station includes:

a determining unit 201, configured to determine at least one collaborative station of at least one neighboring C-RAN for an edge area user on a C-RAN.

The C-RAN master station acquires neighboring cell information of the neighboring C-RAN from a core network or receives the neighboring cell information reported by the edge area user; and the determining unit 201 determines a station list of the neighboring C-RAN according to the neighboring cell information and determines, from the station list, at least one station of at least one neighboring C-RAN as a collaborative station of the C-RAN master station of the edge area user.

The master station queries the collaborative station from an upper-layer network element. The upper-layer network element returns a C-RAN where the collaborative station is located according to a configured network structure and indicates routing information.

In this embodiment, a first exchange unit 202 includes a third exchange unit 203.

The third exchange unit 203 is configured to exchange control data with the neighboring C-RAN collaborative station through a TCP/IP path or a control path of a high speed data exchange path.

In this step, the third exchange unit 203 exchanges the control data with the neighboring C-RAN collaborative station through an established path, where the control data is used for negotiation and message transmission between stations. Firstly, the third exchange unit 203 initiates a handshake signal to the neighboring C-RAN collaborative station according to the routing information provided by the upper-layer network element, and after a response from the neighboring C-RAN collaborative station is received, a communication route is established. Then, the control data is provided for other functional units.

The control data may be exchanged through an established separate TCP/IP path that is used to bear the control data. For example, an X2 interface path may be used. According to the 3GPP, an X2 interface is defined between traditional macro stations, and after a C-RAN solution is adopted, it is assumed that the interface is inherited by the C-RAN. A transmission network layer of the X2 interface is based on IP transmission.

The control data may also be exchanged through a control path of an established physical high speed data exchange path. For example, for transmission of CPRI data, a reserved field of the control path in the CPRI protocol may be used to bear the control data between the C-RAN master station and the neighboring C-RAN collaborative station; and a part of bit data may also be defined in a CPRI I/Q path and used as a control path for exchanging the control data, as shown in FIG. 4, which is a schematic diagram of a CPRI I/Q path used as a control path.

A path establishing unit 204 is configured to establish a data exchange path used for exchanging first data with the neighboring C-RAN collaborative station according to the control data, where the data exchange path for exchanging the first data is a high speed data exchange path.

Data of the edge area user in the present invention is rapid data and occupies a great bandwidth, for example, baseband data. Therefore, if the edge area user wants to obtain a desirable gain, the C-RAN master station and the neighboring C-RAN collaborative station should perform tightly coupled collaboration. The tightly coupled collaboration refers to that coordination data of other stations may be obtained rapidly with a large bandwidth for processing. Conversely, loosely coupled collaboration refers to that low-speed and low-bandwidth data may be obtained for processing.

Currently in the industry, no tightly coupled data exchange path is available between C-RANs, and therefore an edge area user on a C-RAN cannot obtain a gain of the tightly coupled collaboration. A current C-RAN solution in the industry only defines internal interfaces on the C-RAN, but does not define any tightly coupled interface between the C-RANs. However, according to the 3GPP, an X2 interface is defined between traditional macro stations, and after a C-RAN solution is adopted, it is assumed that the interface is inherited by the C-RAN. A transmission network layer of the X2 interface is based on IP transmission and mainly used for signaling transmission, and has a low bandwidth and a great delay. If a traditional X2 interface is adopted between the C-RANs, a loosely coupled collaboration solution, which has a lower gain than the tightly coupled collaboration, is mostly be used for the edge area user on the C-RAN. Therefore, user experience of the edge area user is poorer than that of a user in the coverage of the C-RAN. The solution has the following defects: the gain of the loosely coupled collaboration is less than that of the tightly coupled collaboration; and if the X2 interface is used for the transmission of CPRI Layer-1 data, both the delay and the bandwidth fail to satisfy the requirement of a tightly coupled collaboration algorithm.

In this embodiment, a physical high speed data exchange path is available between a C-RAN master station and a neighboring C-RAN collaborative station, where a part of the high speed data exchange path is defined in step S202 as a path for exchanging control data. In this step, another part of the high speed data exchange path is defined as a data path for exchanging first data. Alternatively, in step S202, a TCP/IP path is used as a path for exchanging the control data; and then, in this step, the entire high speed data exchange path is defined as a data exchange path for exchanging the first data, thereby establishing a data exchange path for exchanging data of an edge area user between the C-RAN master station and the neighboring C-RAN collaborative station. The high speed data exchange path includes: a CPRI interface path, an RIO interface path, and an Ethernet interface path.

According to the embodiment of the present invention, tightly coupled collaboration between a C-RAN master station and a neighboring C-RAN collaborative station may be implemented by using a high speed data exchange path, thereby enabling an edge area user on a C-RAN to obtain a better gain and improving system performance.

A first converging unit 205 is configured to converge the first data with edge area user data of another edge area user that belongs to the same neighboring C-RAN as the edge area user.

In this embodiment, data of the edge area user is exchanged through the high speed data exchange path between the C-RAN master station and the neighboring C-RAN collaborative station. For example, CPRI data is exchanged through a CPRI path that has a fixed rate, however, data of one edge area user from an RRU may not reach the fixed rate, and therefore resources will be wasted if data of only one edge area user is transmitted each time.

In this step, when the C-RAN master station sends the first data to the neighboring C-RAN collaborative station, the first data needs to be converged with the edge area user data of another edge area user that belongs to the same neighboring C-RAN as the edge area user. For example, four pieces of 2.5 G data are converted into 10 G data; and the C-RAN is connected to one neighboring C-RAN by one or more high speed data exchange paths, for example, a CPRI path. One CPRI path has multiple internal channels, and converged data of multiple edge area users is borne in separate channels according to the control data.

In this embodiment, a second exchange unit 206 includes a first sending unit 207 and a first receiving unit 208.

The first sending unit 207 is configured to send the converged data of the edge area user to the neighboring C-RAN through the data exchange path, so that the neighboring C-RAN collaborative station acquires the first data from the neighboring C-RAN and sends the second data to the edge area user according to the control data.

The first sending unit 207 sends the converged data of the edge area user to the neighboring C-RAN through the high speed data exchange path; and then the collaborative station acquires, from a corresponding channel of the neighboring C-RAN, the first data actively sent by the C-RAN master station to the collaborative station, and then the neighboring C-RAN collaborative station parses the control data, where the first data may be I/Q data and may also be RIO data. After receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

The first receiving unit 208 is configured to receive the first data from the neighboring C-RAN collaborative station through the data exchange path.

The first receiving unit 208 instructs, through the control data, the neighboring C-RAN collaborative station to acquire the second data from the edge area user, and then receives the first data sent by the neighboring C-RAN collaborative station, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

According to the C-RAN master station provided by another embodiment of the present invention, the C-RAN master station performs tightly coupled collaboration with a neighboring C-RAN collaborative station by establishing a high speed data exchange path, so that the neighboring C-RAN collaborative station may also exchange data with an edge area user, thereby enabling the edge area user on a C-RAN to obtain a better gain and improving system performance.

Figure 9:
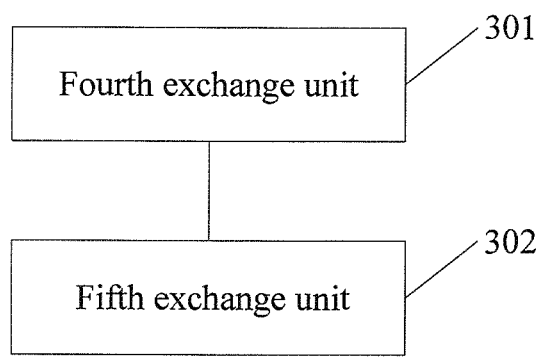
FIG. 9 is a schematic structural diagram of a neighboring C-RAN collaborative station according to an embodiment of the present invention.

FIG. 9 is a schematic structural diagram of a neighboring C-RAN collaborative station according to an embodiment of the present invention. As shown in FIG. 9, the neighboring C-RAN collaborative station includes:

a fourth exchange unit 301, configured to exchange control data with a C-RAN master station to which an edge area user on a C-RAN belongs.

The fourth exchange unit 301 exchanges, through an established path, the control data with the C-RAN master station to which the edge area user on the C-RAN belongs, where the control data is used for negotiation and message transmission between stations. Firstly, the neighboring C-RAN collaborative station receives a handshake signal that is initiated by the C-RAN master station according to routing information provided by an upper-layer network element, and responds to the handshake signal. In this manner, a route for communicating with the C-RAN master station is established. Then, the control data is provided for other functional units.

A fifth exchange unit 302 is configured to exchange, according to the control data, first data with the C-RAN master station through a data exchange path established by the C-RAN master station, so as to exchange second data with the edge area user according to the control data.

The fifth exchange unit 302 exchanges the first data with the C-RAN master station through the data exchange path established by the C-RAN master station; and then the neighboring C-RAN collaborative station parses the control data and exchanges the second data with the edge area user, thereby completing data exchange with the edge area user.

Specifically, in a first aspect, the neighboring C-RAN collaborative station receives the first data that is sent by the C-RAN master station through the data exchange path, and the neighboring C-RAN collaborative station parses the control data, where the first data may be I/Q data and may also be RIO data. After receiving the first data, the neighboring C-RAN collaborative station processes the I/Q data to the second data, namely, an intermediate radio frequency signal, and sends the intermediate radio frequency signal to the edge area user; or firstly processes the RIO data to I/Q data, then processes the I/Q data to the second data, namely, an intermediate radio frequency signal, and sends the intermediate radio frequency signal to the edge area user.

In a second aspect, the neighboring C-RAN collaborative station receives, from the C-RAN master station, the control data that instructs the neighboring C-RAN collaborative station to acquire the second data from the edge area user, and acquires the second data from the edge area user, where the first data is I/Q data or RIO data, and the second data is an intermediate radio frequency signal. The neighboring C-RAN collaborative station receives the intermediate radio frequency signal from the edge area user, processes the intermediate radio frequency signal to the I/Q data, and sends the I/Q data to the C-RAN master station; or firstly processes the intermediate radio frequency signal to the I/Q data, then processes the I/Q data to the RIO data, and sends the RIO data to the C-RAN master station.

According to the neighboring C-RAN collaborative station provided by an embodiment of the present invention, the neighboring C-RAN collaborative station performs coupled collaboration with a C-RAN master station through a data exchange path established by the C-RAN master station, so that the neighboring C-RAN collaborative station may also exchange data with an edge area user, thereby enabling the edge area user on a C-RAN to obtain a better gain and improving system performance.

Figure 10:
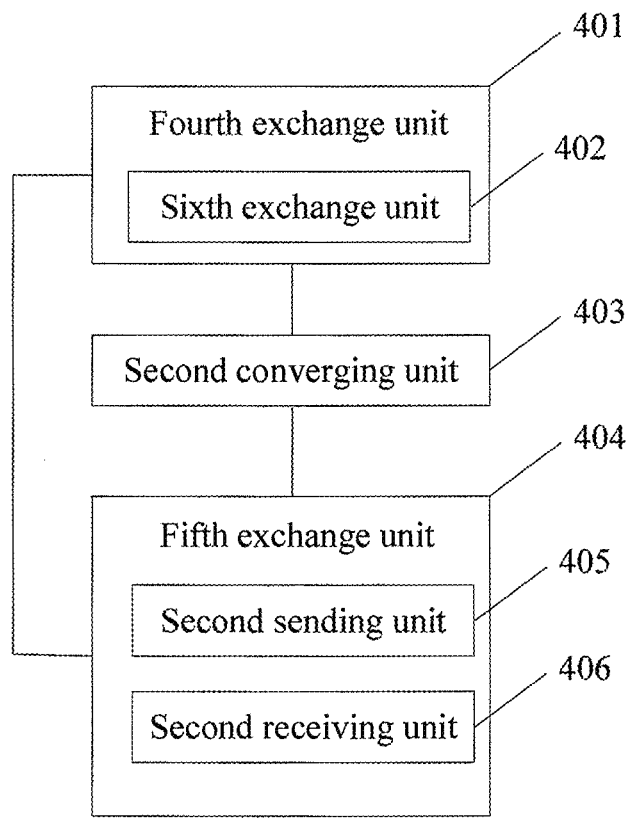
FIG. 10 is a schematic structural diagram of a neighboring C-RAN collaborative station according to another embodiment of the present invention.

FIG. 10 is a schematic structural diagram of a neighboring C-RAN collaborative station according to another embodiment of the present invention. As shown in FIG. 10, the neighboring C-RAN collaborative station includes:

a fourth exchange unit 401, where the fourth exchange unit 401 includes a sixth exchange unit 402.

The sixth exchange unit 402 is configured to exchange, through a TCP/IP path or a control path of a high speed data exchange path, control data with a C-RAN master station to which an edge area user on a C-RAN belongs.

The sixth exchange unit 402 exchanges, through an established path, the control data with the C-RAN master station to which the edge area user on the C-RAN belongs, where the control data is used for negotiation and message transmission between stations. Firstly, the neighboring C-RAN collaborative station receives a handshake signal that is initiated by the C-RAN master station according to routing information provided by an upper-layer network element, and responds to the handshake signal. In this manner, a route for communicating with the C-RAN master station is established. Then, the control data is provided for other functional units.

The control data may be exchanged through an established separate TCP/IP path that is used to bear the control data. For example, an X2 interface path may be used. According to the 3GPP, an X2 interface is defined between traditional macro stations, and after a C-RAN solution is adopted, it is assumed that the interface is inherited by the C-RAN. A transmission network layer of the X2 interface is based on IP transmission.

The control data may also be exchanged through a control path of an established physical high speed data exchange path. For example, for transmission of CPRI data, a reserved field of the control path in the CPRI protocol may be used to bear the control data between the C-RAN master station and the neighboring C-RAN collaborative station; and a part of bit data may also be defined in a CPRI I/Q path and used as a control path for exchanging the control data, as shown in FIG. 4, which is a schematic diagram of a CPRI I/Q path used as a control path.

A second converging unit 403 is configured to converge first data with edge area user data of another edge area user that belongs to the same C-RAN as the edge area user.

In this embodiment, data of the edge area user is exchanged through the high speed data exchange path between the neighboring C-RAN collaborative station and the C-RAN master station. For example, CPRI data is exchanged through a CPRI path that has a fixed rate, however, data of one edge area user from an RRU may not reach the fixed rate, and therefore resources will be wasted if data of only one edge area user is transmitted each time.

When the neighboring C-RAN collaborative station sends the first data to the C-RAN master station, the first data needs to be converged with the edge area user data of another edge area user that belongs to the same C-RAN as the edge area user. For example, four pieces of 2.5 G data are converted into 10 G data; and the C-RAN is connected to one neighboring C-RAN by one CPRI path. One CPRI path has multiple internal channels, and converged data of multiple edge area users is borne in separate channels according to the control data.

Before the convergence is performed, the neighboring C-RAN collaborative station receives second data from the edge area user, where the second data may be an intermediate radio frequency signal, processes the second data to the first data, and converges the first data with the edge area user data of another edge area user that belongs to the same C-RAN as the edge area user. The first data herein may be I/Q data, and to process the second data to the first data is to process the intermediate radio frequency signal to RIO data and then process the RIO data to the I/Q data. Alternatively, the first data may also be RIO data, and to process the second data to the first data is to process the intermediate radio frequency signal to the RIO data.

In this embodiment, a fifth exchange unit 404 includes a second sending unit 405 and a second receiving unit 406.

The second sending unit 405 is configured to send the converged data of the edge area user to the C-RAN through the data exchange path, so that the C-RAN master station acquires the first data from the C-RAN.

The neighboring C-RAN collaborative station sends the converged data of the edge area user to the C-RAN through the high speed data exchange path; and then the master station acquires, from a corresponding channel of the C-RAN, the first data sent by the neighboring C-RAN collaborative station to the master station.

The second receiving unit 406 is configured to receive the first data from the C-RAN master station through the data exchange path, where the data exchange path for exchanging the first data is a high speed data exchange path.

The neighboring C-RAN collaborative station receives the first data from the C-RAN master station through the high speed data exchange path and sends the first data to the edge area user.

According to the neighboring C-RAN collaborative station provided by another embodiment of the present invention, the neighboring C-RAN collaborative station performs tightly coupled collaboration with a C-RAN master station through a high speed data exchange path established by the C-RAN master station, so that the neighboring C-RAN collaborative station may also exchange rapid and great-bandwidth data with an edge area user, thereby enabling the edge area user on a C-RAN to obtain a better gain and improving system performance.

The present invention further provides a system for exchanging data of an edge area user on a C-RAN. The system includes the C-RAN master station and the neighboring C-RAN collaborative station according to the foregoing embodiments of the present invention, where the C-RAN master station determines a neighboring C-RAN collaborative station for the edge area user on the C-RAN.

The C-RAN master station exchanges control data with the neighboring C-RAN collaborative station.

The C-RAN master station is connected to the neighboring C-RAN collaborative station through a data exchange path used for exchanging first data.

The C-RAN master station exchanges the first data with the neighboring C-RAN collaborative station through the data exchange path, so that the neighboring C-RAN collaborative station exchanges second data with the edge area user according to the control data.

A manner for networking a C-RAN and a neighboring C-RAN includes: a star type, a chain type, or a ring shape.

Figure 11:
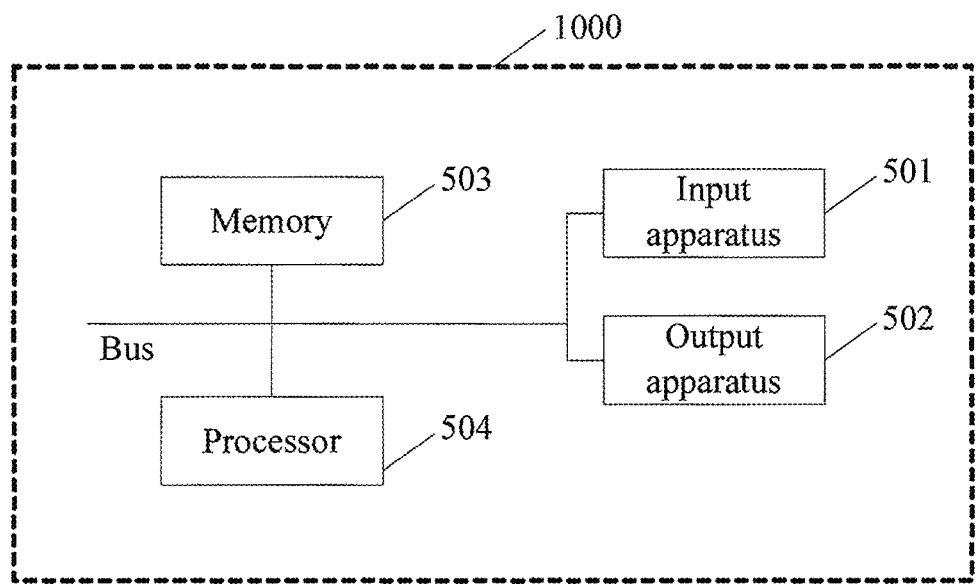
FIG. 11 is a schematic structural diagram of a device for exchanging data of an edge area user on a C-RAN according to an embodiment of the present invention.

FIG. 11 is a schematic structural diagram of a device for exchanging data of an edge area user on a C-RAN according to an embodiment of the present invention. As shown in FIG. 11, the device 1000 may include:

an input apparatus 501, an output apparatus 502, a memory 503, and a processor 504 (a network device may have one or more processors 504, and one processor is taken as an example in FIG. 11). In some embodiments of the present invention, the input apparatus 501, the output apparatus 502, the memory 503, and the processor 504 may be connected by a bus or by other means, where the connection by means of a bus is taken as an example in FIG. 11.

The processor 504 executes the following steps: determining at least one collaborative station of at least one neighboring C-RAN for the edge area user on the C-RAN; exchanging control data with the neighboring C-RAN collaborative station; establishing, according to the control data, a data exchange path used for exchanging first data with the neighboring C-RAN collaborative station; and exchanging the first data with the neighboring C-RAN collaborative station through the data exchange path, so that the neighboring C-RAN collaborative station exchanges second data with the edge area user according to the control data.

It should be understood that a function of each functional module of the device 1000 in this embodiment may be specifically implemented according to methods in the foregoing method embodiments, and for a specific implementation process thereof, reference may be made to a related description of a foregoing method embodiment. No further details are provided herein.

Figure 12:
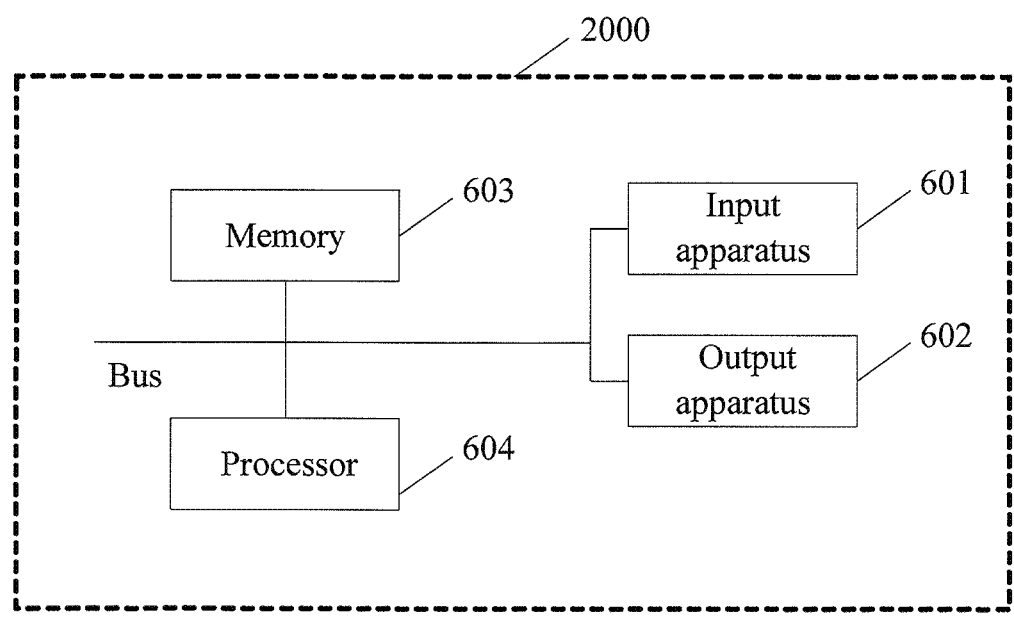
FIG. 12 is a schematic structural diagram of a device for exchanging data of an edge area user on a C-RAN according to another embodiment of the present invention.

FIG. 12 is a schematic structural diagram of a device for exchanging data of an edge area user on a C-RAN according to another embodiment of the present invention. As shown in FIG. 12, the device 2000 may include:

an input apparatus 601, an output apparatus 602, a memory 603, and a processor 604 (a network device may have one or more processors 604, and one processor is taken as an example in FIG. 12). In some embodiments of the present invention, the input apparatus 601, the output apparatus 602, the memory 603, and the processor 604 may be connected by a bus or by other means, where the connection by means of a bus is taken as an example in FIG. 12.

The processor 604 executes the following steps: determining at least one collaborative station of at least one neighboring C-RAN for the edge area user on the C-RAN; exchanging control data with the neighboring C-RAN collaborative station; establishing, according to the control data, a data exchange path used for exchanging first data with the neighboring C-RAN collaborative station; and exchanging the first data with the neighboring C-RAN collaborative station through the data exchange path, so that the neighboring C-RAN collaborative station exchanges second data with the edge area user according to the control data.

It should be understood that a function of each functional module of the device 2000 in this embodiment may be specifically implemented according to methods in the foregoing method embodiments, and for a specific implementation process thereof, reference may be made to a related description of a foregoing method embodiment. No further details are provided herein.

It should be noted that, for the purpose of simplifying the description of the foregoing method embodiments, the methods are described as a series of action combinations, but persons skilled in the art should know that the present invention is not limited by the sequence of described actions, because according to the present invention, some steps may be performed in other orders or performed simultaneously. Secondly, persons skilled in the art should also know that all embodiments described in the specification are exemplary embodiments, and the involved actions and modules are not indispensable parts of the present invention.

In the foregoing embodiments, descriptions of the embodiments have different emphases, and for parts that are not described in detail in one embodiment, reference may be made to the related description of other embodiments.

Persons of ordinary skill in the art should understand that all or a part of the steps in various methods of the foregoing embodiments may be accomplished by using a program to instruct related hardware. The program may be stored in a readable storage medium of a computer, including a read only memory, a random access memory, a magnetic disk or an optical disk.

The foregoing describes in detail the method and the related apparatus for exchanging data of an edge area user on a C-RAN according to the embodiments of the present invention. The principle and implementations of the present invention are described by using specific examples. The description of the embodiments is merely provided to facilitate comprehension of the methods and core ideas of the present invention. In addition, persons of ordinary skill in the art can make variations and modifications to the present invention in terms of the specific embodiments and application scopes according to the ideas of the present invention. Therefore, the content of the specification shall not be construed as a limit to the present invention.

What is claimed is:

1. A cloud radio access network (C-RAN) master station, comprising:

a memory; and a processor in communication with the memory, wherein the C-RAN master station is configured to:

determine at least one collaborative station of at least one neighboring C-RAN for an edge area user on a first C-RAN;

exchange control data with the neighboring C-RAN collaborative station, wherein the control data is used for negotiation and message transmission between stations;

establish, according to the control data, a data exchange path used for exchanging first data between the C-RAN master station and the neighboring C-RAN collaborative station;

exchange the first data between the C-RAN master station and the neighboring C-RAN collaborative station through the data exchange path, so that the neighboring C-RAN collaborative station exchanges second data with the edge area user on the first C-RAN according to the control data;

converge the first data with edge area user data of another edge area user that belongs to the same neighboring C-RAN as the edge area user;

send the converged data of the edge area user to the neighboring C-RAN through the data exchange path, so that the neighboring C-RAN collaborative station acquires the first data from the neighboring C-RAN and sends the second data to the edge area user according to the control data; and receive the first data from the neighboring C-RAN collaborative station through the data exchange path.

2. The C-RAN master station according to claim 1, wherein the C-RAN master station is further configured to exchange the control data with the neighboring C-RAN collaborative station through a Transmission Control Protocol/Internet Protocol (TCP/IP) path or a control path of a high speed data exchange path.

3. The C-RAN master station according to claim 1, wherein the data exchange path used for exchanging the first data is a high speed data exchange path, and the high speed data exchange path comprises a common public radio interface (CPRI) path, a rapid input/output (RIO) interface path, or an Ethernet interface path.

4. The neighboring cloud radio access network (C-RAN) collaborative station, comprising:

a memory; and a processor in communication with the memory, wherein the neighboring C-RAN collaborative station is configured to:

exchange control data with a C-RAN master station to which an edge area user on a first C-RAN belongs, wherein the control data is used for negotiation and message transmission between stations; and exchange, according to the control data, first data with the C-RAN master station through a data exchange path established by the C-RAN master station, so as to exchange second data between the neighboring C-RAN collaborative station and the edge area user on the first C-RAN according to the control data;

converge the first data with edge area user data of another edge area user that belongs to the first C-RAN;

send the converged data of the edge area user to the first C-RAN through the data exchange path, so that the C-RAN master station acquires the first data from the C-RAN; and receive the first data from the C-RAN master station through the data exchange path.

5. The neighboring C-RAN collaborative station according to claim 4, wherein the neighboring C-RAN collaborative station is further configured to exchange, through a Transmission Control Protocol/Internet Protocol (TCP/IP) path or a control path of a high speed data exchange path, the control data with the C-RAN master station to which the edge area user on the first C-RAN belongs.

6. The neighboring C-RAN collaborative station according to claim 4, wherein the data exchange path used for exchanging the first data is a high speed data exchange path, and the high speed data exchange path comprises a common public radio interface (CPRI) path, a rapid input/output (RIO) interface path, or an Ethernet interface path.

7. A system for exchanging data of an edge area user on a first cloud radio access network (C-RAN), the system comprising:

a C-RAN master station on the first C-RAN and a neighboring C-RAN collaborative station on a neighboring C-RAN, wherein each of the C-RAN master station and the neighboring C-RAN collaborative station comprises a memory and a processor in communication with the memory;

wherein the C-RAN master station determines the neighboring C-RAN collaborative station for the edge area user on the first C-RAN;

the C-RAN master station exchanges control data with the neighboring C-RAN collaborative station, wherein the control data is used for negotiation and message transmission between stations;

the C-RAN master station is connected to the neighboring C-RAN collaborative station through a data exchange path used for exchanging first data;

the C-RAN master station exchanges the first data with the neighboring C-RAN collaborative station through the data exchange path, so that the neighboring C-RAN collaborative station exchanges second data with the edge area user according to the control data;

the C-RAN master station converges the first data with edge area user data of another edge area user that belongs to the same neighboring C-RAN as the edge area user;

the C-RAN master station converges sends the converged data of the edge area user to the neighboring C-RAN through the data exchange path, so that the neighboring C-RAN collaborative station acquires the first data from the neighboring C-RAN and sends the second data to the edge area user according to the control data; and the C-RAN master station converges receives the first data from the neighboring C-RAN collaborative station through the data exchange path.

8. The system according to claim 7, wherein the first C-RAN and the neighboring C-RAN are connected using a star type network, a chain type network, or a ring shape network.

* * * * *